Dec. 20, 1938.  C. C. FARMER  2,140,642
RAILWAY VEHICLE ACCELERATION CONTROL APPARATUS
Original Filed Jan. 23, 1934
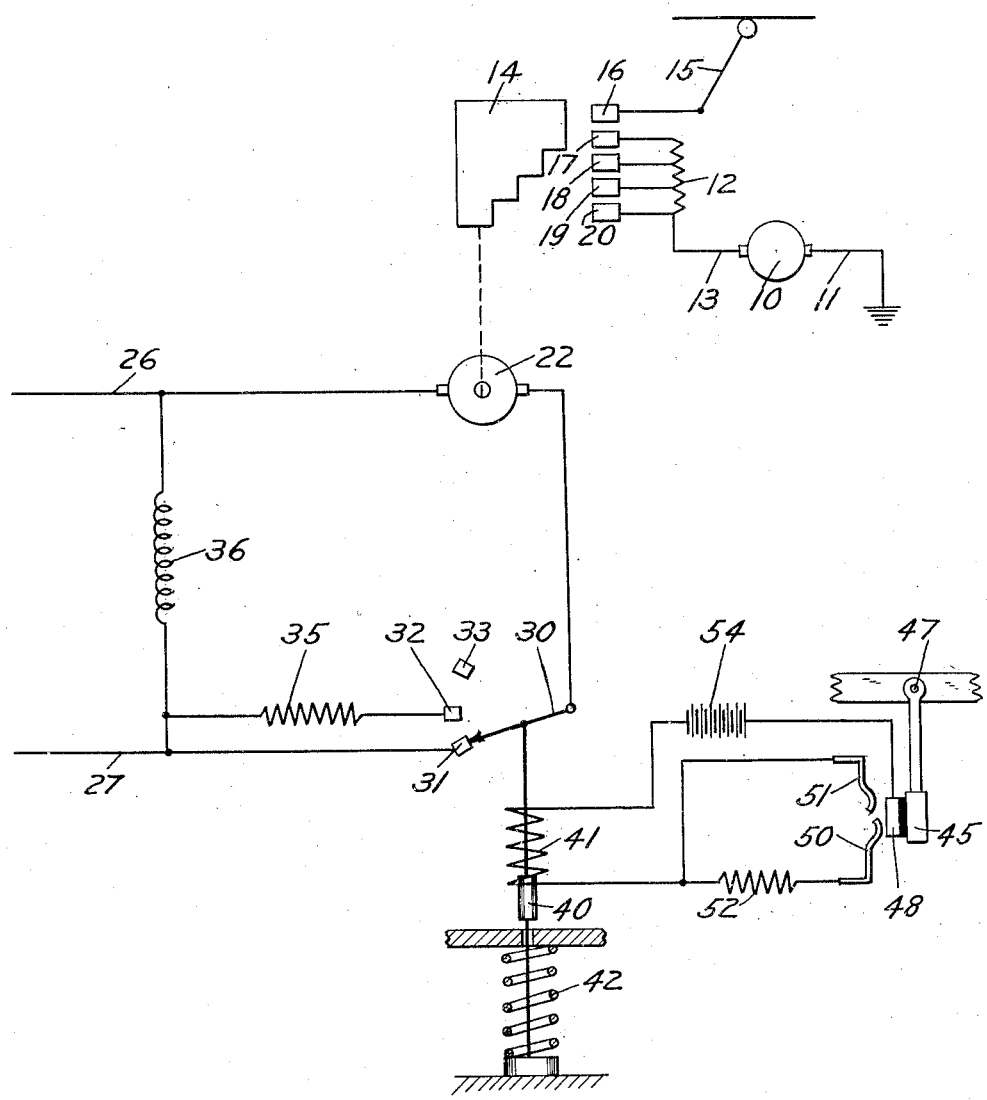
INVENTOR
CLYDE C. FARMER
BY
Wm. M. Cady
ATTORNEY Patented Dec. 20, 1938

2,140,642

UNITED STATES PATENT OFFICE 2,140,642

RAILWAY VEHICLE ACCELERATION CONTROL APPARATUS

Clyde C. Farmer, Pittsburgh, Pa., assignor to The Westinghouse Air Brake Company, Wilmerding, Pa., a corporation of Pennsylvania Original application January 23, 1934, Serial No. 707,918. Divided and this application March 12, 1935, Serial No. 10,627

2 Claims. (Cl. 172—179)

This invention relates to railway vehicle control apparatus and more particularly to apparatus for controlling the rate of acceleration of a railway vehicle.

This application is a division of my application, Serial No. 707,918, filed January 23, 1934, for Railway vehicle control apparatus.

In the operation of railway or traction vehicles it is desirable that the vehicle be accelerated as rapidly as possible without slipping or spinning of the wheels of the vehicle. While this may be accomplished manually it is most effectively accomplished by some form of automatic control means so that starting of the vehicle may be effected independently of the skill of an operator.

It is the principal object of my invention to provide apparatus responsive to changes in the speed of a vehicle for controlling the rate of acceleration of the vehicle so that starts may be made automatically under the control of the apparatus and in the shortest possible time.

It is another object of my invention to provide a control device having a member responsive to the rate of increase in speed of the vehicle, and which is adapted to operate contacts to control the vehicle driving motor and thereby regulate the rate of acceleration of the vehicle.

It is another object of my invention to provide a control device adapted to control the driving motor of a vehicle, the operation of the device being such that starting of the driving motor is effected by manually controlled means, the operation of the motor thereafter being controlled by means responsive to the rate of increase in the speed of the vehicle, whereby the driving motor of the vehicle is automatically controlled to produce a predetermined rate of acceleration of the vehicle.

Other objects of the invention and features of novelty will be apparent from the following description taken in connection with the accompanying drawing, the single figure of which is a diagrammatic view of one embodiment of the control system provided by my invention.

Referring to the drawing I have illustrated the control system provided by my invention as applied to an electrically driven vehicle. The driving motor for the vehicle is indicated by the reference numeral 10, one terminal of this motor veing connected to ground by means of the wire 11 while the other terminal of the motor is connected to the resistance 12 by means of the wire 13.

A power controlling switch is provided to control the supply of current to motor 10, and this switch comprises a movable contact 14 which is mounted on a rotatable drum and which is adapted, at certain times, as will hereinafter more fully appear, to engage the stationary contact 16 which is permanently connected to the trolley 15, and certain of the stationary contacts 17 to 20, inclusive, which are associated with the resistance 12, to control the supply of current to the driving motors.

A motor for driving the drum on which the movable contact 14 is mounted is also provided, this motor having an armature indicated at 22, which armature is connected with the drum of the power controller in any suitable manner so that the drum of the power controller is rotated in accordance with the speed of the armature 22.

Current to the motor associated with the power controller is supplied from any suitable source by means of the wires 26 and 27. The wire 26 is connected to one terminal of the armature 22 while the other terminal of the armature is connected to a movable contact 30 which is adapted at certain times to engage the contacts 31, 32 and 33. The contact 31 is connected directly to the wire 27 leading to the source of current, while the contact 32 is connected to the wire 27 through the resistance 35. The contact 33 is a blind contact and is not associated with any circuit. The shunt field 36 of the motor is connected across the supply wires 26 and 27.

The movable contact 30 is adapted to be actuated by an electroresponsive device in the form of a relay having a plunger 40 which is operated when the winding 41 is energized. The spring 42 acts upon a movable stop associated with the plunger 40 to urge the movable contact 30 downwardly into engagement with the contact 31.

Means responsive to the rate of acceleration of the vehicle is provided to control the energization of the winding 41 and this means comprises a weighted body 45 suspended from a pivot 47, and carrying a contact 48 insulated therefrom and which is adapted to successively engage the fixed contacts 50 and 51. The weighted body 45 may be mounted at any convenient point on the vehicle and is arranged so as to be movable in a plane extending longitudinally of the vehicle and so that the body is moved towards the contacts 50 and 51 in response to an increase in the rate of acceleration of the vehicle.

The contact 50 is connected to one terminal of the winding 41 through the resistance 52, while the contact 51 is connected directly to the same terminal of the winding. The other terminal of the winding 41 is connected to one terminal of a suitable source of current, such as a battery 54, while the other terminal of the battery 54 is connected to the movable contact 48.

The rate of acceleration of a vehicle is dependent upon the rate of increase in the supply of current to the driving motor of the vehicle, and on a vehicle equipped with the control apparatus provided by this invention, the rate of increase in the supply of current to the vehicle driving motor is dependent upon the rapidity with which the drum of the power controller is moved from the off position to the full on position. The rate of movement of this drum is governed by the speed of the motor associated with the power controller, and the speed of this motor is preferably such that when the motor is operated at its normal or full speed, the drum of the power controller will be moved towards the full on position somewhat more rapidly than is required to produce the desired rate of acceleration of the vehicle.

The speed of the motor associated with the power controller is controlled by the movable contact 30 so as to be reduced below the normal or full speed at times. The contact 30 is controlled in response to variations in the supply of current to the winding 41 of the electroresponsive device which is associated with the movable contact 30, and the supply of current to the winding 41 is governed by means responsive to changes in the rate of acceleration of the vehicle. The supply of current to the vehicle driving motor will, therefore, be controlled in response to changes in the rate of acceleration of the vehicle.

In operation, the movable contact 30 is normally maintained in engagement with the contact 31 by the spring 42, while the contact 48 is maintained out of engagement with the contacts 50 and 51, and the drum carrying the contact 14 is maintained in the position in which the contact 14 is out of engagement with the contacts 16 to 20, inclusive. In order to start the vehicle the circuit to the motor associated with the power controller is completed by manually operated means (not shown), and the drum carrying contact 14 is rotated by the armature 22 towards the full on position, which is the position in which the contact 14 engages the contact 20, at which time all of the resistance 12 is cut out of the circuit from the trolley 15 to the driving motor 10.

As the vehicle accelerates, the body 45 of the inertia-responsive means moves to the left, as viewed in the drawing, first causing the contact 48 to engage the contact 50 so that the winding 41 is energized through the resistance 52. Energization of the winding 41 results in an upward pull on the plunger 40 in opposition to the spring 42. The winding 41 and the spring 42 are proportioned so that when the winding 41 is energized through the resistance 52 the plunger 40 is moved upwardly a distance great enough to move the movable contact into engagement with the contact 32, whereupon the resistance 35 is connected in series with the armature 22 of the motor associated with the power controller causing the motor to drive the drum of the power controller at a lower speed, thus reducing the rate of increase in the supply of current to the vehicle driving motor and reducing the rate of acceleration of the vehicle.

If the rate of acceleration of the vehicle is still greater than that desired, the body 45 moves farther to the left with the result that the contact 48 will next engage the contact 51, whereupon the winding 41 will be energized to a greater degree, and will move the contact 30 out of engagement with the contact 32 and into engagement with the blind contact 33. The circuit through the armature 22 will thereby be interrupted and progressive acceleration of the vehicle will be stopped.

Upon a decrease in the rate of acceleration of the vehicle below that desired the body 45 will move toward the right until contact 48 disengages from contact 51, or from both contacts 50 and 51, to effect energization of the motor associated with the power controller, either through the resistance 35 or independently of this resistance. Thereafter the body 45 will control the energization of the winding 41 through the contacts 50 and 51 to maintain a substantially constant desired rate of acceleration.

While one embodiment of the control apparatus provided by my invention has been illustrated and described in detail it should be understood that the invention is not limited to these details of construction and that numerous changes and modifications may be made without departing from the scope of the following claims.

Having now described my invention, what I claim as new and desire to secure by Letters Patent, is:

1. In a vehicle acceleration apparatus, the combination with a motor for operating an acceleration controller, a relay operable to control the speed of said motor, a control device having an inertia operated member, and means whereby one movement of said member operates said relay to effect a change in the speed of said motor and another movement of said member operates said relay to effect a different change in the speed of said motor.

2. In a vehicle control apparatus, in combination, a driving motor, means including a control motor for controlling the supply of current to the driving motor, a resistance device, a relay having a biased position and operable when energized to a first degree to connect said resistance device in series with said control motor armature and operable when energized to a second degree to open the circuit to said control motor armature, two normally open contacts the closure of a first of which energizes said relay to said first degree and the closure of the second of which energizes said relay to said second degree, and inertia operated means operated at one rate of acceleration to close said first contact and operated at another rate of acceleration to close said second contact.

CLYDE C. FARMER.